United States Patent [19]

Le Touche

[11] Patent Number: 5,330,124
[45] Date of Patent: Jul. 19, 1994

[54] THERMAL PROTECTION DEVICE USING THE VAPORIZATION AND SUPERHEATING OF A RECHARGEABLE LIQUID

[75] Inventor: Roger Le Touche, Ecquevilly, France

[73] Assignee: Aerospatiale Societe Nationale Industrielle, Paris, France

[21] Appl. No.: 25,991

[22] Filed: Mar. 3, 1993

[30] Foreign Application Priority Data

Mar. 3, 1992 [FR] France ............... 92 02517

[51] Int. Cl.$^5$ ............... B64C 1/38
[52] U.S. Cl. ............... 244/117 A; 244/158 A; 165/110
[58] Field of Search ............... 244/117 A, 158 A, 163, 244/160; 165/911

[56] References Cited

U.S. PATENT DOCUMENTS

| | | | |
|---|---|---|---|
| 3,026,806 | 3/1962 | Runton et al. | 244/117 A |
| 3,321,154 | 5/1967 | Downs | 244/163 |
| 3,392,781 | 7/1968 | Zuber et al. | 165/133 |
| 3,793,861 | 2/1974 | Burkhard et al. | 244/117 A |
| 3,797,781 | 3/1974 | Hollis | 244/163 |
| 3,908,936 | 9/1975 | Durran | 244/117 A |

FOREIGN PATENT DOCUMENTS 0358897 7/1989 European Pat. Off. ....... B64G 1/50

*Primary Examiner*—Michael S. Huppert
*Assistant Examiner*—Anne E. Bidwell
*Attorney, Agent, or Firm*—Hayes, Soloway, Hennessey, Grossman & Hage

[57] ABSTRACT

A device for thermal protection of a structure (22) is provided. In one embodiment the device comprises a retention layer (12) impregnated by a fluid substance that is normally in the liquid state. The fluid substance is resupplied to the retention layer via a porous membrane that is impermeable to the substance when it is in the liquid state but is permeable thereto when it is in the vapor state. The membrane is interposed between the retention layer and a supply space for the substance in its liquid state adjacent the structure to be protected.

19 Claims, 2 Drawing Sheets

THERMAL PROTECTION DEVICE USING THE VAPORIZATION AND SUPERHEATING OF A RECHARGEABLE LIQUID

BACKGROUND OF THE INVENTION

FIELD OF THE INVENTION

The invention relates to a device for ensuring, for an unlimited period of time, the thermal protection of a structure liable to be located in an environment which may be subject to virtually unlimited temperature rises.

Such a thermal protection device has numerous applications with respect to the protection of human beings and equipment both on the ground and in the atmosphere. However, the invention is of particular interest for those applications involving ambient pressure variations and the application to the structure to be protected of variable accelerations and decelerations.

The invention more particularly relates to a thermal protection device incorporating a retention layer initially impregnated with a fluid substance in the liquid state when the external temperature does not exceed a certain threshold. Such a thermal protection device is normally referred to as a "transpiring" thermal protection. Thus, when subject to an external thermal action, the fluid substance initially in the liquid state and normally retained in the retention layer progressively vaporizes in the atmosphere from the retention layer. The thus formed vapour is reheated by the external thermal flux before escaping into the atmosphere, so that the heat quantity removed is higher the higher the thermal flux to which the device is exposed. Therefore the liquid-impregnated retention layer is sometimes referred to as a "vaporizer-superheater element" or "hydrator-superheater element". The configuration of such a "transpiring" thermal protection and its operating procedure are described in detail in FR-A-2 512 169.

As is also described in the latter document, such a "transpiring" thermal protection can be equipped with a system making it possible to reinject fluid substance in the liquid state into the retention layer, so as to permit an increase in the life of the thermal protection beyond the time necessary for the complete vaporization of the fluid substance in the liquid state initially contained in the retention layer.

It is generally possible without any particular difficulty to reinject with the aid of the pump fluid substance in the liquid state into the retention layer of a "transpiring" thermal protection under substantially constant pressure and acceleration conditions, such as occurs with most terrestrial applications of such a thermal protection. However, the reinjection of the fluid substance in the liquid state into the retention layer becomes very complex when the envisaged application assumes significant pressure and acceleration variations, as is particularly the case for aeronautical and space applications. It then becomes virtually impossible to supply the retention layer in a homogeneous manner, so that the thermal protection becomes locally ineffective in certain zones. Therefore for such special applications no thermal protection exists which is able to fulfil its function for an unlimited period, so that it can be used again, if necessary, without any special maintenance.

The present invention specifically relates to a thermal protection device of the "transpiring" thermal protection type, whose original design makes it possible to ensure a homogeneous resupply of fluid substance to the retention layer of the thermal protection, no matter what the pressure and acceleration variations which are undergone by the structure carrying said thermal protection.

The invention also relates to a thermal protection device of the "transpiring" thermal protection type, whose original design makes it possible to protect a structure liable to be subject to significant pressure and acceleration variations for an unlimited period, no matter what the ambient temperature, and such that the thermal protection device can be reused for an undetermined number of missions without requiring replacement.

SUMMARY OF THE INVENTION

According to the invention these results are obtained by means of a thermal protection device incorporating at least one retention layer impregnated with a fluid substance normally in the liquid state and having a boiling point below a maximum admissible temperature of a structure to be protected and means for recharging with fluid substance the retention layer, characterized in that the means for recharging the retention layer incorporates a membrane which is impermeable to the fluid substance in the liquid state and permeable to the fluid substance in the vapour state and which is interposed between the retention layer and a supply space for the fluid substance in the liquid state, adjacent to the structure to be protected.

In such a thermal protection device, the retention layer is resupplied with fluid substance in the vapour state when all the fluid substance in the liquid state initially contained in said retention layer has been vaporized. In view of the fact that the fluid substance used for resupplying the retention layer penetrates the latter in the vapour state, said resupply takes place automatically and homogeneously no matter what the pressure and acceleration variations undergone by the structure to be protected. It consequently becomes possible to produce thermal protection devices having virtually no life limitation and temperature limitation in aeronautical and space applications, which has not been the case up to now. Thus, the virtually unlimited use time of the thermal protection device according to the invention permits the reuse thereof a very large number of times without any special maintenance and under extreme temperature conditions, which is not the case with any prior art thermal protection.

In a preferred embodiment of the invention the membrane is separated from the retention layer by a separation space, so that the fluid substance in the liquid state present in the supply space does not accidentally traverse the membrane by capillarity, as a result of a direct contact between the retention layer and the membrane.

In another embodiment of the invention, the membrane has pores and a thickness greater than approximately ten times the diameter of said pores. The membrane can then be in direct contact with the retention layer, because an accidental passage through the membrane by the fluid substance in the liquid state under the effect of capillarity is then prevented by the membrane thickness.

Moreover, the membrane is made from a material not wettable by the fluid substance in the liquid state and having good mechanical characteristics up to the boiling point of the fluid substance. This result can be obtained with the aid of a large number of materials and among which reference is made in an exemplified and non-limitative manner to metal fabrics or fabrics based on fibres coated with polytetrafluoroethylene.

If the structure to be protected is impermeable to the substance, the fluid substance supply space is in direct contact with said structure. However, when the structure to be protected is permeable to the substance, the supply space is separated from said structure by a wall impermeable to the substance.

The fluid substance in the liquid state is introduced into the supply space with the aid of injection means, which can be in different forms as a function of the envisaged application.

In the particular case where the thermal protection device is placed on part of the structure of a spacecraft liable to be subject to an intense thermal flux during an acceleration phase corresponding to its launch and during a deceleration phase corresponding to its reentry into the earth's atmosphere, the injection means can comprises means sensitive to the accelerations and decelerations of the spacecraft.

According to a first embodiment of the invention, the injection means then incorporates a double-acting jack having a longitudinal axis oriented substantially in the direction of the accelerations and decelerations of the craft and means for alternately connecting two opposite chambers of the jack to a reservoir of fluid substance in the liquid state and to the supply space, as a function of whether the craft is subject to accelerations or decelerations. Advantageously, the double-acting jack then has a larger cross-section on the side of the craft towards which is oriented the thermal protection device than on the other side.

According to a second embodiment of the invention, the injection means incorporates a pump controlled by an electric motor, whose supply voltage is regulated by an accelerometer.

BRIEF DESCRIPTION OF THE DRAWINGS

The invention is described in greater detail hereinafter relative to non-limitative embodiments and with reference to the attached drawings, wherein show.

DETAILED DESCRIPTION OF PREFERRED EMBODIMENTS

Figure 1:
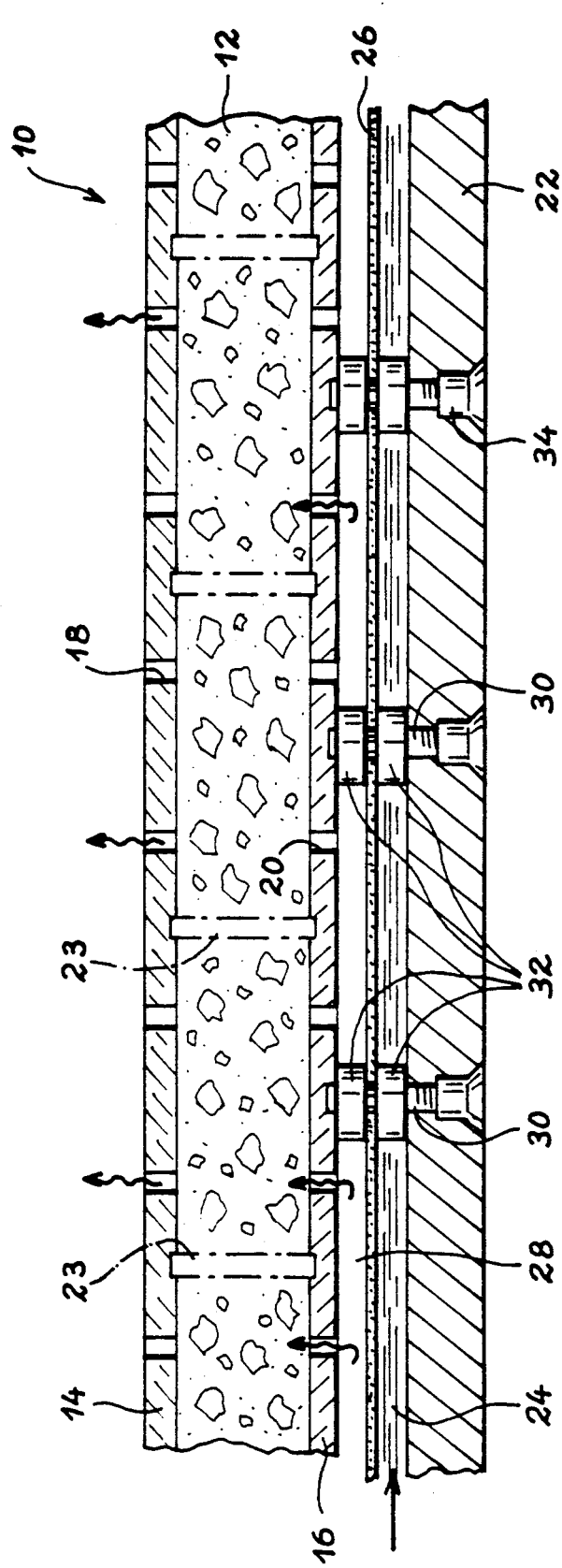
FIG. 1 A sectional view showing a thermal protection shield according to the invention.
Figure 2:
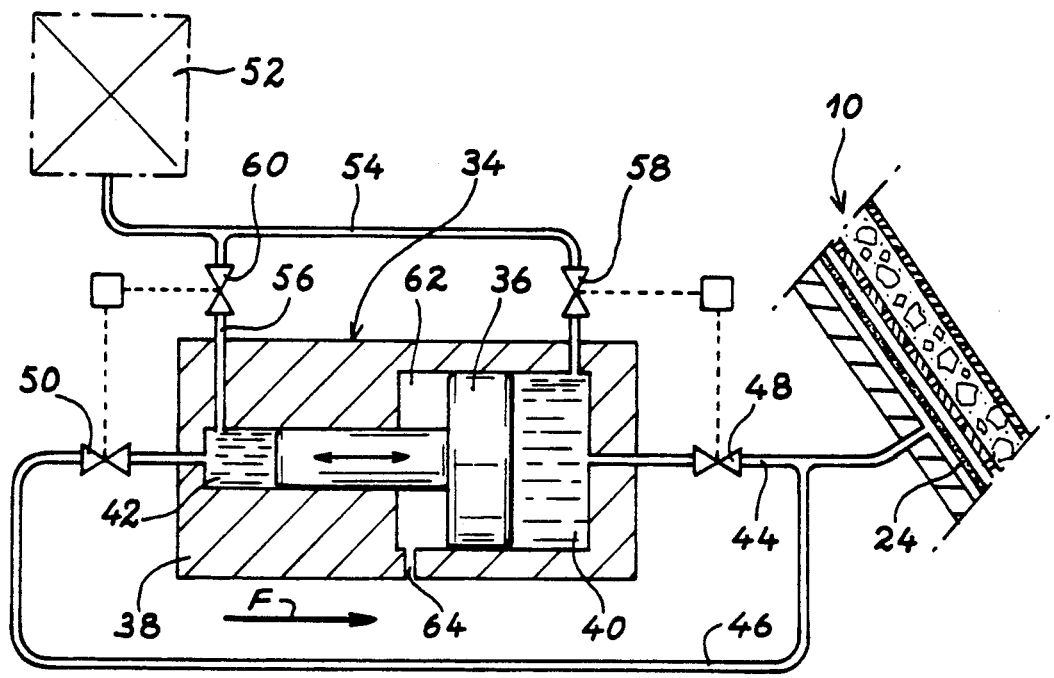
FIG. 2 A diagrammatic view partly illustrating in section a first embodiment of the means making it possible to inject the liquid into the supply space of the thermal protection shield of FIG. 1.
Figure 3:
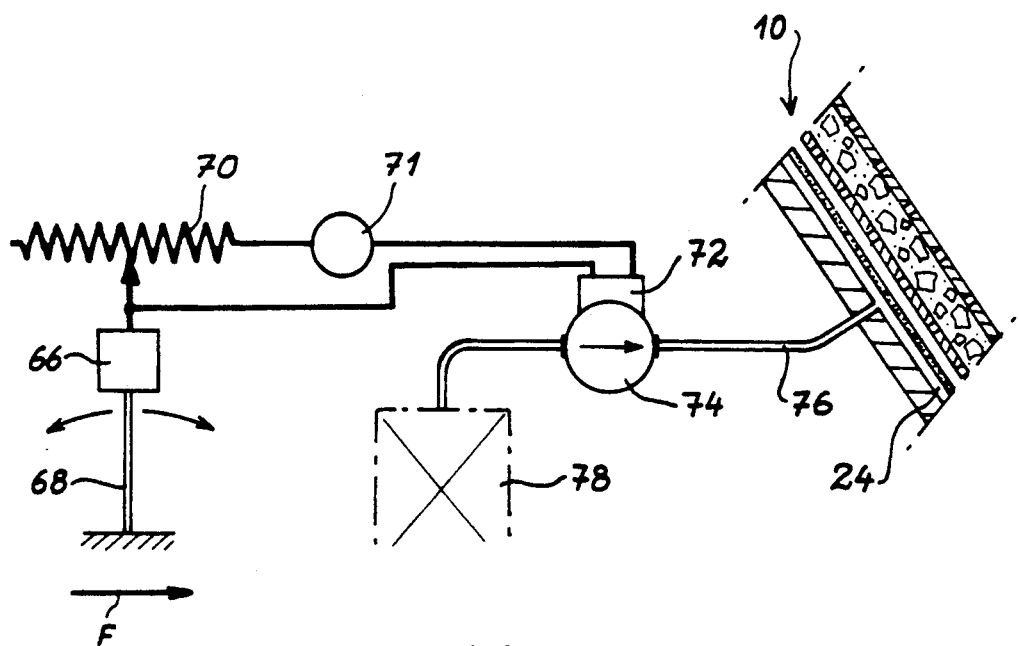
FIG. 3 A diagrammatic view comparable to FIG. 2 illustrating a second embodiment of the means making it possible to inject liquid into the supply space of the thermal protection shield of FIG. 1.

The thermal protection device according to the invention is essentially constituted by a thermal protection shield, which can be placed on parts of the structure to be protected against external heat action, and means for injecting into said thermal protection shield a fluid substance in the liquid state, in order to extend in random manner the period during which the said shield fulfils its function. An exemplified embodiment of the thermal protection shield is shown in FIG. 1. With regards to the means for injecting the fluid substance in the liquid state, two embodiments are shown in FIGS. 2 and 3.

In FIG. 1, reference numeral 10 designates in general terms a "transpiring" thermal protection shield, which mainly has a retention layer 12 made from a fluid substance able to absorb and retain in its interior a fluid substance which is in the liquid state under normal temperature and pressure conditions. As described in detail in FR-A-2 512 169, the material fulfilling this function in the retention layer 12 can be an aqueous colloidal silica gel, retained by a reinforcing member, which can in particular be constituted by a network of woven or non-woven fibres.

The fluid substance in the liquid state which initially impregnates the retention layer 12 is chosen as a function of the maximum admissible temperature for the structure to be protected under pressure conditions where the device is required to function. More specifically, the boiling or vaporization temperature of the fluid substance in the liquid state and which impregnates the retention layer 12 must be below the maximum permitted temperature of the structure to be protected under the aforementioned conditions. If this admissible maximum temperature exceeds 100° C., water constitutes a particularly advantageous solution, bearing in mind its particularly low cost and ready availability. However, numerous other fluid substance can be chosen, particularly if the temperature of the structure must remain below the boiling point of water at the pressure in question.

In order to preserve the integrity and confinement of the retention layer 12, said layer is placed between two plates or films respectively forming an external plate 14 in contact with the external atmosphere and an internal plate 16 turned towards the side of the structure 22 to be protected.

The materials constituting the plates 14 and 16 can be of different types, provided that they fulfil a certain number of conditions resulting from on the one hand their function as defined hereinbefore and on the other the need not to disturb the operation of the thermal protection shield. The first condition makes it necessary to choose materials, whose mechanical characteristics remain completely satisfactory even under the extreme temperature conditions to which the thermal protection shield is exposed and must not lead to any significant deformations of said shield under these extreme conditions. The second condition makes it necessary to permit the passage of the fluid substance impregnating the retention layer 12 in the vapour state, when an external temperature rise leads to a vaporization of the fluid substance in the liquid state. The plates 14 and 16 can be rigid, semi rigid or flexible, as a function of the envisaged application.

In the embodiment illustrated in FIG. 1, the plates 14 and 16 are rigid plates made from materials whose respective expansion coefficients lead to virtually no deformation of the thermal protection shield when the temperature varies between the extreme conditions corresponding to the envisaged application. These materials can in particular have virtually zero expansion coefficients such as INVAR (registered trademark) and/or carbon - carbon composite materials.

The porosity of the plates 14 and 16 with respect to the fluid substance contained in the retention layer 12, when the latter is in the vapour state, is then obtained by perforations 18 and 20 regularly distributed over the entire surface of the plates 14 and 16 respectively. In addition, the integrity of the assembly constituted by the plates 14, 16 and the retention layer 12 placed between these plates is ensured by connecting rods 23, whose ends are fixed to the plates 14 and 16 and which are regularly distributed between the latter. The connecting rods 23 can be fixed to the plates 14 and 16 by any random means, e.g. welding, when the plates are metallic.

According to the invention, instead of being fixed directly to the structure 22 to be protected, illustrated in the form of a metal sheet in FIG. 1, the "transpiring" thermal protection shield formed by the retention layer 12 trapped between the plates 14 and 16 is separated from the structure 22 by a space 24 for supplying the shield 10 with a fluid substance in the liquid state. More specifically, said supply space 24 is able to receive a film of the fluid substance in the liquid state and which is separated from the thermal protection shield 20 by a membrane or diaphragm 26, which is itself separated from the inner plate 60 of the shield by a separating space 28 preventing any direct contact between the membrane 28 and the inner plate 16. The fluid substance injected into the supply space 24 is the same as that initially impregnating the retention layer 12.

The material constituting the membrane 26 is chosen so as to be impermeable to the fluid substance injected into the supply space 24, when said fluid substance is in the liquid state. However, this material must be permeable to the aforementioned fluid substance when it is in the vapour state. In order that these characteristics are respected, the material used for producing the membrane 26 is a material not wettable by the fluid substance in the liquid state and whose mechanical characteristics remain satisfactory up to the boiling or vaporization temperature of said fluid substance. If this was not the case, the sealing of the membrane 26 to the product in the liquid state would not be ensured.

Materials able to meet these different criteria are available in large numbers and reference is made in exemplified manner to a wire gauze or a glass fibre fabric coated with polytetrafluoroethylene, particularly in the case where the fluid substance impregnating the retention layer 12 and injected into the supply space 24 is water.

The membrane 26 has uniformly distributed pores, whose maximum diameter (i.e. the minimum dimension of the largest pore of the membrane) determines, for a given impregnation fluid substance for the retention 12, the height of said fluid substance in the stabilized liquid state blocked by the membrane, as a function of the acceleration value to which the structure is exposed. This height H is defined by the following relation:

$$H = \frac{4A}{\Phi \gamma \rho} \quad (1)$$

with:
H = height of liquid stabilized and blocked by the membrane (in meters)
A = surface tension of the liquid (in $Nm^{-1}$)
$\gamma$ = acceleration (g=9.81 on the ground)
$\Phi$ = diameter of the membrane pores (in meters)
$\rho$ = liquid density (in $kg/m^3$).

The separating space 18 provided between the membrane 26 and the actual thermal protection shield 10 ensures that the fluid substance in the liquid state contains in the supply space 24 cannot pass by capillarity into the retention layer 12 when it is still in the liquid state. Thus, this could lead to the partial emptying of the supply space 24 and consequently would make the thermal protection ineffective in certain areas.

The separating space 28 and the supply space 24 have reduced thicknesses (e.g. below 3 mm), to limit to the greatest possible extent the overall dimensions of the device and also the weight thereof when the fluid substance in the liquid state has been allowed to enter the supply space 24.

In a not shown constructional variant, the thickness of the membrane 26 is adequate for the separating space 18 to be eliminated without any risk of the fluid substance in the liquid state traversing the membrane by capillarity. Specifically, this direct contact between the membrane 26 and the thermal protection shield 10 is possible when the membrane thickness exceeds approximately ten times the diameter of the pores formed in the latter.

Among the numerous means usable for fixing the thermal protection shield 10, as well as the membrane 26 to the structure 22 to be protected, by providing on either side of the membrane the spaces 24 and 28, FIG. 1 shows in exemplified manner the case where said function is fulfilled by rods 30 fixed by one end to the plate 16 and by their opposite ends to the structure 22. The spaces 24 and 28 are formed by two spacing washers 32 or similar means placed on each of the rods 30 and between which is trapped the membrane 26.

The means for fixing the rods 30 to the plate 16 and to the structure 22 can be of a random nature. Thus, the rods 30 can be welded to the plate 16 when the latter is metallic and have an opposite threaded end onto which is screwed a nut 34 ensuring the fixing of the rod to the structure 22.

It must be noted that the passage through the membrane 26 by each of the rods 30 must take place in such a way that the sealing of the membrane with respect to the fluid substance in the liquid state is maintained. This can be brought about by placing not shown gaskets or packings between the washers 32 and the membrane 26.

Moreover, to avoid the formation of heat bridges between the structure 22 to be protected and the outer plate 14, particularly when the rods 22 and 30 are metallic, said rods are advantageously arranged in staggered manner, as illustrated in FIG. 1.

An identical sealing must also be provided between the fluid substance in the liquid state contained in the supply space 24 and the structure 22. If said structure is impermeable to the substance, said sealing action is obtained without any special precautions, except when the rods 30 traverse the structure 22 in the manner illustrated in FIG. 1, which makes it necessary to provide a not shown gasket or packing between each of the washers 32 and the structure 22.

In the not shown case where the structure 22 to be protected is permeable to the substance, a sealing skin can be placed on said structure, so as to define the supply space 24 from said side.

The injection of the fluid substance in the liquid state into the supply space 24 can take place by any random means such as a pump injecting the liquid from a storage tank provided for this purpose.

When the heat action against which the structure 22 has to be protected coincides with acceleration and deceleration phases of said structure, two special injection means will now be described with successive reference to FIGS. 2 and 3. This application more particularly relates to the case where the structure to be protected is located on a spacecraft which can be subject to heating effects during its launch and during its reentry into the earth's atmosphere.

In the embodiment illustrated in FIG. 2, the means for injecting the fluid substance in the liquid state comprise a double-acting jack 34, whose longitudinal axis is oriented substantially parallel to the displacement direction of the craft and designated by the arrow F in the drawing. This displacement direction corresponds to the direction of the accelerations and decelerations to which the craft is exposed during take-off and during reentry into the earth's atmosphere.

The double-acting jack 34 incorporates a stepped piston 36 able to slide in a cylinder 38, so as to vary the volumes of a front chamber 40 and a rear chamber 42 when the piston 36 is exposed to the aforementioned accelerations and decelerations. The front 40 and rear 42 chambers are connected to the supply space 24 of the thermal protection shield 10 by pipes 44, 46 equipped with non-return valves 48, 50. The pipes 44, 46 advantageously have a common part issuing into the supply space 24.

Moreover, the front 40 and rear 42 chambers also communicate with a reservoir 52 of the fluid substance in the liquid state by means of two pipes 54 and 56 advantageously having a common part issuing into the said reservoir 52. Each of the pipes 54 and 56 is equipped with a non-return valve 58 and 60, which are coupled to the non-return valves 48 and 50, in such a way that the valves 48 and 60 are opened simultaneously and the valves 50 and 58 are then closed. Conversely, the valves 50 and 58 are simultaneously opened and the valves 48 and 60 are then closed.

As stated hereinbefore, the piston 86 is a stepped piston, i.e. that part of the piston which defines the front chamber 40 has a larger diameter than that part of the piston which defines the rear chamber 42. Taking account of this configuration, an intermediate chamber 62 is formed between the piston 36 and the cylinder 88. This intermediate chamber 62 is linked with the exterior by a passage 64, so as not to impede the movements of the piston 36.

In the arrangement described hereinbefore, when the craft undergoes an acceleration, the piston 36 tends to move rearwards under the effect of its inertia, i.e. towards the left with reference to FIG. 2. An accelerometer or a comparable system then brings about the opening of the valves 50 and 58 and the closing of the valves 60 and 48. Consequently, the fluid substance in the liquid state present in the rear chamber 42 is injected by the pipe 46 into the supply chamber 24 of the thermal protection shield 10. Simultaneously, the fluid substance in the liquid state contained in the reservoir 82 is introduced into the front chamber 40 by the pipe 54. In view of the fact that the front chamber 40 has a larger diameter than the rear chamber 42, there is an increase in the thrust force by which the fluid substance in the liquid state is injected into the supply space 24. This increase is determined in such a way as to compensate the recall action due to the inertia of the fluid substance in the liquid state, when the thermal protection shield 10 is turned towards the front of the craft and as illustrated in FIG. 2.

Conversely, when the craft undergoes a deceleration, the piston 36 tends to move towards the front of the craft. The valves 48 and 60 are then opened and the valves 50 and 58 closed. It is then the fluid substance in the liquid state contained in the front chamber 40 which is injected into the supply space 24 of the thermal protection shield 10, whereas the fluid substance in the liquid state from the reservoir 52 is introduced into the rear chamber 40. The ratio of the cross-sections between the front and rear chambers of the jack 34 then acts in the opposite way, which compensates the fact that the liquid present in the pipe 44, due to its inertia, then tends to naturally penetrate the supply space 24, when the thermal protection shield 10 is turned towards the front. When said shield 10 is oriented in the opposite direction, a comparable operation of the device is obtained by reversing the double-acting jack 34 compared with the above description.

In another embodiment of the injection means illustrated in FIG. 3, the craft is equipped with an accelerometer constituted by a mass or weight 66 mounted on a spring 68, so as to be able to move rearwards or forwards depending on whether the craft is exposed to acceleration or a deceleration. As hereinbefore, the craft movement direction, i.e. the direction of said accelerations and decelerations, is designated by the arrow F. The accelerometer mass 66 operates a rheostat 70 placed in an electrical circuit incorporating a power supply 71 and an electric motor 72. The electric motor 72 is preferably a direct current motor used for operating a pump 74 placed in a pipe 76, which connects a reservoir 78 of the fluid substance in the liquid state to the supply space 24 of the thermal protection shield 10.

In this arrangement, the supply voltage of the electric motor 72 varies as a function of whether the craft is exposed to a deceleration or an acceleration. According to the value of said voltage, the pump 74 is operated faster or slower, which has the effect of injecting into the supply space or chamber 24 of the thermal protection shield 10 the fluid substance in the liquid state as soon as the extent of the acceleration or deceleration requires the coming into action of the thermal protection device according to the invention.

It is clear that the same craft can be equipped with several thermal protection shields of different dimensions located at strategic points of said craft. In this case, the injection of the fluid substance in the liquid state into the supply space of each of these shields can be carried out with the aid of a common injection means.

It may also prove desirable to partition the supply space 24 of the same thermal protection shield when the latter is very large, so as to ensure that the liquid height stabilized and blocked by the membrane can never pass below the liquid height possibly applied to said membrane.

Thus, by applying the relation 1 given hereinbefore and in the hypothesis of using water as the liquid and as the membrane a wire gauze coated with polytetrafluoroethylene having pores with a diameter equal to or smaller than 100 $\mu$m, a stabilized and blocked water height of approximately 10 cm is obtained for an acceleration of 1 g, approximately 2 cm for an acceleration of 5 g and approximately 2 mm for an acceleration of 50 g. Moreover, for a zero acceleration (0 g), the height of liquid blocked by the membrane is infinite.

This example makes it clear that the diameter of the pores must be determined beforehand taking account of the maximum acceleration to which the structure to be protected can be exposed during use.

When a thermal protection device according to the invention is subject to heat action, it initially functions in the same way as the device described in FR-A-2 512 169. In other words, the fluid substance in the liquid state initially impregnating the retention layer 12 progressively vaporizes from the outside of the shield and escapes from the latter as superheated steam. When the fluid substance in the liquid state remains present in the retention layer, it is ensured that the temperature of the structure 22 is below the vaporization temperature of the fluid substance.

When all the fluid substance in the liquid state initially impregnating the retention layer 12 has been used up, the temperature of the rear plate 16 reaches and exceeds the vaporization temperature of the fluid substance in the liquid state and by convection heats the membrane 26 and the fluid substance in the liquid state then admitted into the supply space 24. The vapours created in this way in the space 24 traverse the membrane 26 and homogeneously supply the retention layer 12. A continuous supply of the supply space 24, e.g. with the aid of a pump and/or one of the devices described relative to FIGS. 2 and 3, makes it possible to thermally protect for an unlimited period the structure 22, whilst ensuring that the temperature of the latter remains below the vaporization temperature of the fluid substance. It should be noted that this result could not be obtained previously, when the structure was required to undergo significant pressure and deceleration variations.

Apart from this essential advantage of the thermal protection device according to the invention, it should be noted that this device makes it possible to obtain this result no matter what the temperature level reached outside the thermal protection shield 10, because an increase in the temperature only has the effect of increasing the fluid substance consumption for a given period.

Yet another advantage of the thermal protection device according to the invention relates to its reusable character without any time period limitation, which is explained by the fact that the only consumable element is constituted by the fluid substance injected into the supply space 24. This is an essential advantage not provided by any of the known protection thermal devices.

Obviously, the invention is not limited to the embodiments described in exemplified manner hereinbefore and covers all variants thereof. Thus, the special structure described with reference to FIG. 1 only constitutes one exemplified embodiment. Thus, it is possible to replace the thermal protection shield 10 having a single retention layer 12 by a multilayer shield, like that described in FR-A-2 547 895. Moreover, the supply of fluid substance in the liquid state with respect to the supply space 24 can take place continuously or discontinuously using very varied, single or multiple means, those described relative to FIGS. 2 and 3 only constituting non-limitative examples.

I claim:

1. A device for thermal protection of a structure, and comprising:
    a. at least one retention layer impregnated with a fluid substance which is normally in the liquid state and has a boiling point that is below a maximum permissible temperature of said structure; and
    b. means for resupplying said retention layer with said substance, said resupplying means comprising a porous membrane that is impermeable to said substance when said substance is in said liquid state but is permeable thereto when said substance is in the vapor state, said membrane being interposed between said retention layer and a supply space for supplying said substance when said substance is in the liquid state, said supply space being adjacent to said structure.

2. A device according to claim 1, and including a space separating the membrane from the retention layer.

3. A device according to claim 1, wherein the membrane is in direct contact with the retention layer, and has a thickness exceeding approximately ten times the diameter of its pores.

4. A device according to claim 1, wherein the membrane comprises a material which is (a) not wettable by the substance in the liquid state, and (b) has good mechanical characteristics up to the boiling point of the substance.

5. A device according to claim 1, wherein the structure to be protected is impermeable to said substance, and the supply space is in direct contact with said structure.

6. A device according to claim 1, wherein the structure to be protected is permeable to the substance, and the supply space is separated from said structure by a wall that is impermeable to said substance.

7. A device according to claim 1, wherein said supply space communicates with means for injecting the substance in the liquid state.

8. A device according to claim 7, wherein the injection means is sensitive to accelerations and decelerations of a craft incorporating the device.

9. A device according to claim 8, wherein the injection means comprises a double-acting jack having a longitudinal axis oriented in the direction of the accelerations and decelerations of the craft, and includes means for selectively connecting two opposite chambers of the jack to a reservoir of the substance in the liquid state and to the supply space depending upon whether the craft is exposed to accelerations or decelerations.

10. A device according to claim 9, wherein the double-acting jack has a larger cross-section towards a first side of the craft towards which is oriented the thermal protection device.

11. A device according to claim 8, wherein the injection means comprises a pump controlled by an electric motor whose supply voltage is regulated by an accelerometer.

12. A device for thermal protection of a structure, and comprising:
    a. at least one retention layer impregnated with a fluid substance which is normally in the liquid state and has a boiling point that is below a maximum permissible temperature of said structure; and
    b. means for resupplying said retention layer with said substance, said resupplying means comprising a porous membrane that is impermeable to said substance when said substance is in said liquid state but is permeable thereto when said substance is in the vapor state, said membrane being interposed between said retention layer and a supply space communicating with an injection means which comprises a double-acting jack having a longitudinal axis oriented in the direction of the accelerations and decelerations of the craft, and including means for selectively connecting two opposite chambers of the jack to a reservoir of the substance in the liquid state and to the supply space depending upon whether the craft is exposed to accelerations or decelerations.

13. A device according to claim 12, and including a space separating the membrane from the retention layer.

14. A device according to claim 12, wherein the membrane is in direct contact with the retention layer, and has a thickness exceeding approximately ten times the diameter of its pores.

15. A device according to claim 12, wherein the membrane comprises a material which is (a) not wettable by the substance in the liquid state, and (b) has good mechanical characteristics up to the boiling point of the substance.

16. A device according to claim 12, wherein the structure to be protected is impermeable to said substance, and the supply space is in direct contact with said structure.

17. A device according to claim 12, wherein the structure to be protected is permeable to the substance, and the supply space is separated from said structure by a wall that is impermeable to said substance.

18. A device according to claim 12, wherein the double-acting jack has a cross-section that decreases from a side of said jack closest to the side of the craft towards which is oriented the thermal protection device to the side of said jack farthest from said side of said craft.

19. A device according to claim 12, wherein the injection means comprises a pump controlled by an electric motor whose supply voltage is regulated by an accelerometer.

* * * * *